US006770353B1

(12) United States Patent
Mardilovich et al.

(10) Patent No.: US 6,770,353 B1
(45) Date of Patent: Aug. 3, 2004

(54) CO-DEPOSITED FILMS WITH NANO-COLUMNAR STRUCTURES AND FORMATION PROCESS

(75) Inventors: Peter Mardilovich, Corvallis, OR (US); Alexander Govyadinov, Corvallis, OR (US); David Neiman, Corvallis, OR (US); Gregory S Herman, Albany, OR (US); David Champion, Lebanon, OR (US); James O'Neil, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/341,651

(22) Filed: Jan. 13, 2003

(51) Int. Cl.[7] ............................. B32B 3/00; H01M 8/00; H01J 27/00
(52) U.S. Cl. ................... 428/209; 428/210; 428/304.4; 428/446; 428/450; 428/698; 313/230; 429/12
(58) Field of Search ................................ 428/195, 210, 428/304.4, 446, 450, 209, 698; 313/230; 429/12

(56) References Cited

U.S. PATENT DOCUMENTS

| 4,072,864 A | * | 2/1978 | von Gutfeld ............. 250/338.4 |
| 5,866,204 A | | 2/1999 | Robbie et al. |
| 6,206,065 B1 | | 3/2001 | Robbie et al. |
| 6,248,422 B1 | | 6/2001 | Robbie et al. |
| 6,359,383 B1 | * | 3/2002 | Chuang et al. ............. 313/496 |
| 6,426,590 B1 | * | 7/2002 | Chung et al. ................ 313/496 |
| 6,498,426 B1 | * | 12/2002 | Watabe et al. .............. 313/310 |
| 2002/0034882 A1 | | 3/2002 | Avniel et al. |
| 2003/0197457 A1 | * | 10/2003 | Komoda et al. ............ 313/310 |

FOREIGN PATENT DOCUMENTS

| JP | 2000100316 A | * | 4/2000 | ............ H01J/1/312 |
| WO | WO9742645 | * | 11/1997 | |

* cited by examiner

Primary Examiner—Stephen Stein

(57) ABSTRACT

The invention concerns co-deposited films with nano-columnar structures. A film of the invention is formed upon a substrate, and includes a nano-columnar structure of a first material and a co-deposited second material.

24 Claims, 15 Drawing Sheets

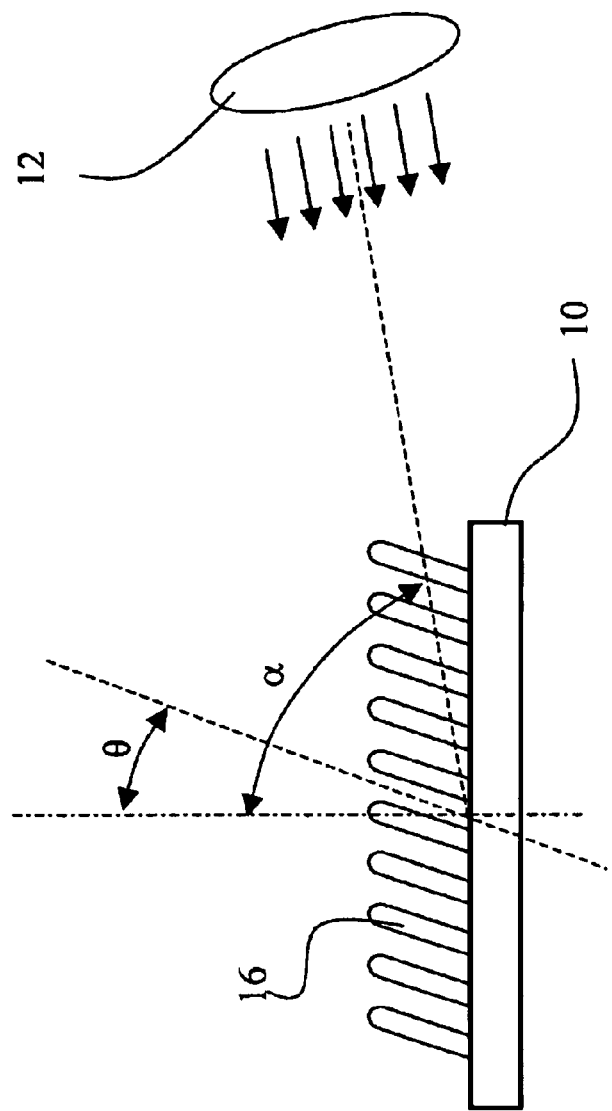

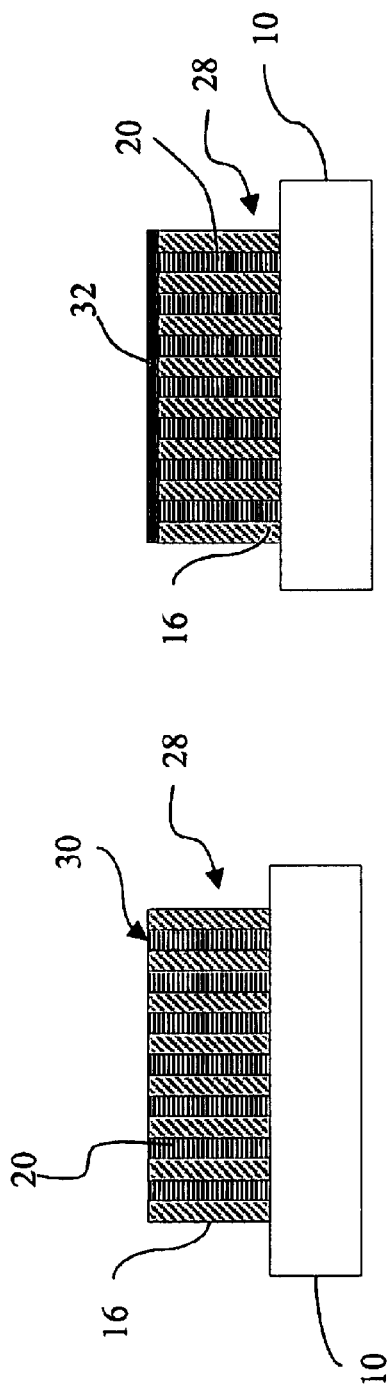
FIG. 7A
FIG. 7B
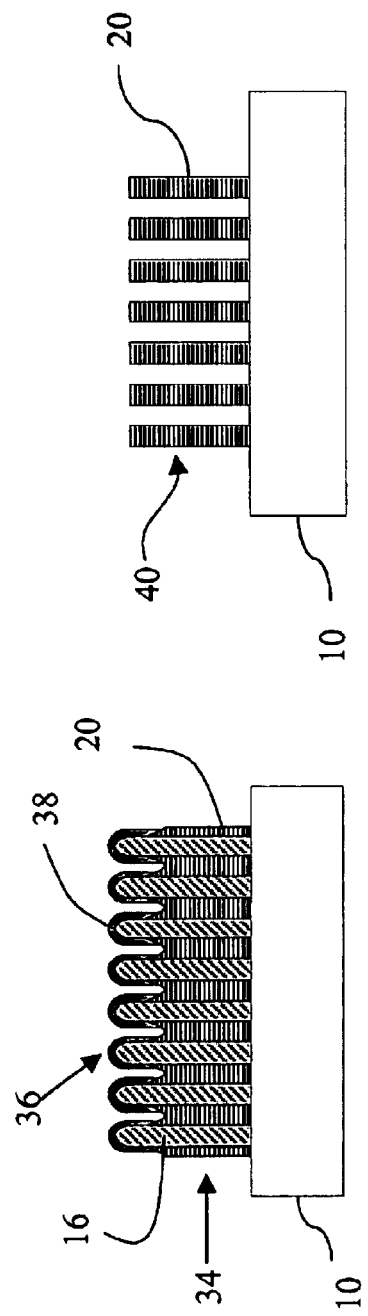
FIG. 7C
FIG. 7D

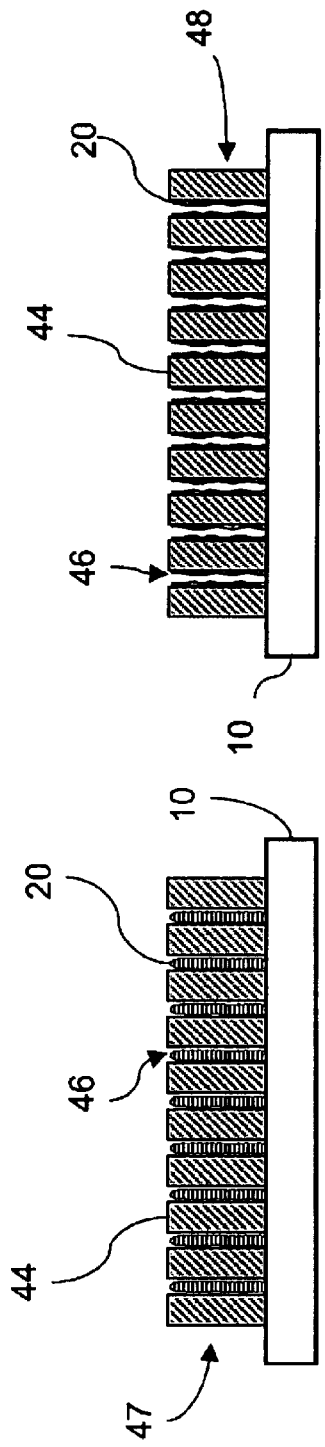
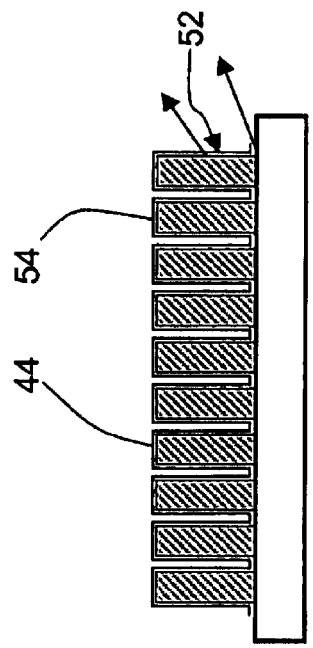
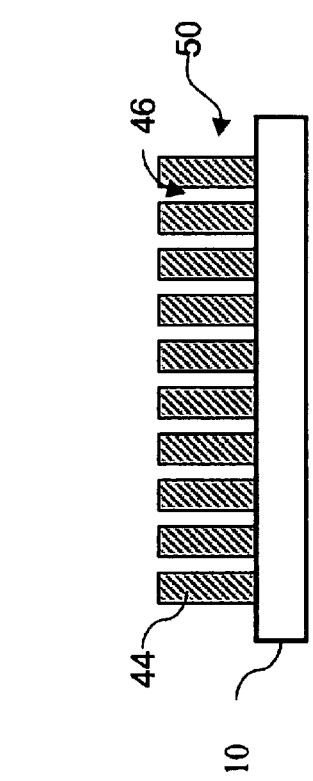
FIG. 10A
FIG. 10B
FIG. 10C
FIG. 10D

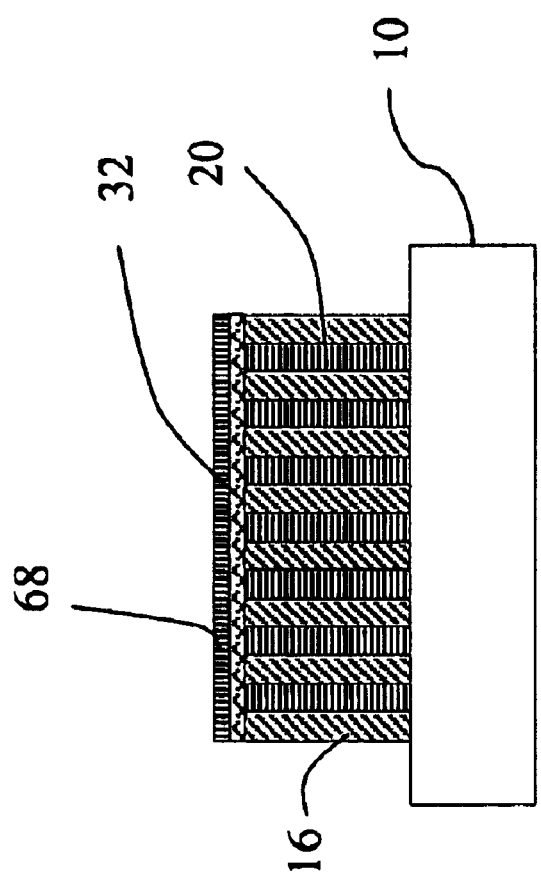

CO-DEPOSITED FILMS WITH NANO-COLUMNAR STRUCTURES AND FORMATION PROCESS

FIELD OF THE INVENTION

The invention is in the field of thin films. The invention particularly concerns angle physical vapor deposition (APVD) processes and nano-structures formed by APVD, including modified GLAD processes.

BACKGROUND OF THE INVENTION

Glancing angle deposition (GLAD) is a recent technology that permits the deposition of complex shapes and structures that may be, for example, incorporated into microelectronic and micromechanical devices. In conventional GLAD processes, controlled isolated columnar structures having simple or complex shapes are formed upon a substrate. Columnar, as used herein, includes a variety of generally elongated, isolated shapes. Complex shapes achieved with a material by GLAD, for example, have included rods, triangles and spring-like structures.

The GLAD process is a fabrication process using thin-film deposition, by sputtering. Controlled movements of the substrate upon which a nano-structure is being formed combined with an oblique angular vapor flux produce a variety of shapes for the nano-structure material. A particular routine of computer controlled substrate movements during deposition will create a certain shape. A different set of computer-controlled movements during deposition will create different shapes. Movements include variable rotation of the substrate, and variable inclination of the substrate relative to the target.

Much early research has been devoted to the variation of the shapes achieved during deposition. Shapes are almost as wide-ranging in the discussion and research of GLAD as potential applications, which include optoelectronics and micromechanical devices. Research has focused on the incorporation of a discontinuous GLAD nano-columnar structure as being independently beneficial based solely upon the shape and the isolated nature of the resultant nano-columnar structures. There remains a need in the art for regularly structured films and for the extension of the APVD and GLAD processes.

SUMMARY OF THE INVENTION

The invention concerns co-deposited films with nano-columnar structures. A film of the invention is formed upon a substrate, and includes a nano-columnar structure of a first material and a co-deposited second material.

BRIEF DESCRIPTION OF THE DRAWINGS

FIG. 2 (Prior art) schematically illustrates a conventional glancing angle deposition (GLAD) process and resultant structure;

FIGS. 7A–7D are schematic cross-section side views of preferred embodiment films;

FIGS. 10A–10D illustrate preferred films having throughout porosity;

FIG. 12 schematically illustrates a preferred embodiment tunneling dielectric emitter of the invention.

Table of Acronyms

Figure 1B:
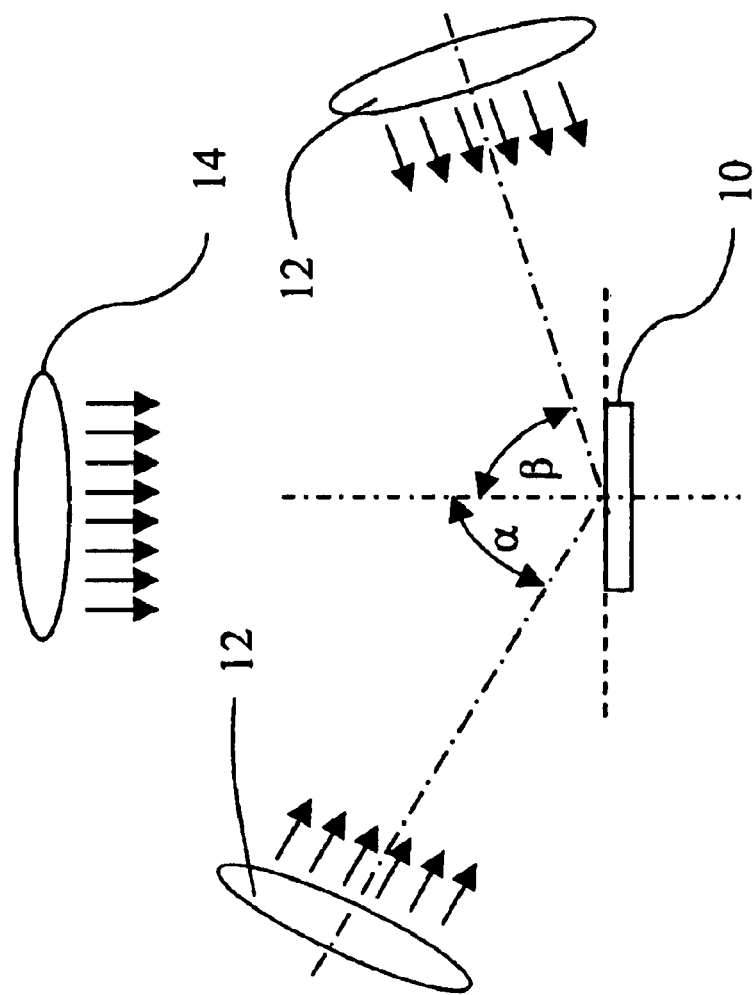
FIGS. 1A–1B are schematic diagrams illustrating angle physical vapor deposition (APVD)

Acronyms are used in the specification. For ease of reference, the following is a list of acronyms and their meanings.

GLAD—glancing angle deposition,
ALD—atomic layer deposition,
APVD—angle physical vapor deposition;
PECVD—plasma enhanced chemical vapor deposition,
CVD—chemical vapor deposition,
PVD—physical vapor deposition,
SILAR—successive ion layer adsorption and reaction
SOFC—solid oxide fuel cell,
YSZ—Yttrium-stabilized zirconia,
SDC—$Sm_xCe(1-x)O_y$, samaria doped ceria,
SSCO—Samardum strontium cobalt oxide,
ITO—indium tin oxide,
A or B target material A or B,
$\alpha$, or $\beta$—deposition angle, angle o f vapor flax and substrate surface,
$\theta$—nano-column angle, preferred angle of co-deposition vapor flux.

DETAILED DESCRIPTION OF THE INVENTION

The invention concerns films formed as a result of a multi-material co-deposition process in which one of the materials is formed by APVD, such as a GLAD process, and the materials lack miscibility. Preferred embodiment films include continuous films having embedded discontinuous nano-columnar structures. Other preferred embodiment films include films having throughout porosity, i.e., pores extending completely through the film. An important example of the preferred films with embedded discontinuous nano-columnar structures is a nodular silicon film with a uniform surface including regularly spaced nodules.

The films with throughout porosity have high surface area. The increased surface area will make the films suitable for various applications, depending on the selected materials for the film. For example, the high surface area due to porosity will be advantageous for thin film fuel cell s and electrodes for thin film batteries. An additional example is use of the thin film layer of the invention as a sensor material. High surface area resultant from the pores extending completely through can increase response time or sensitivity.

Nodular silicon comprising a preferred embodiment of the invention includes regularly spaced nodules. For use as an electron supply layer in an emission device, this uniformity can permit the utilization of a high percentage of emission sites. The uniformity achieved in nodular silicon embodiments of the invention, though, exhibits another more general aspect of the invention shared by other embodiments, including, for example, the thin films with pores extending completely through. This aspect of the invention is the highly organized nature of the films and structures of the invention. Nano-columnar structures are used in all embodiments of the invention to organize the films and structures of the invention.

The formation of nano-columnar structures used in certain embodiments of the invention may utilize the substrate movements of any of the conventional GLAD processes. These include two-dimensional and three-dimensional movements between substrate and vapor flux, typically and most easily achieved by movement of substrates. Embodiments of the invention use GLAD movements and vapor flux angles with a co-deposit of a second material as a filler to form a continuous film. In illustrating the preferred general embodiments, a general designation for materials will be used, with materials "A" and "B". A wide range of materials may be used in accordance with the invention. Materials A and B must be different and must lack miscibility. Preferred example materials for A and B include: Au, Sm, Co, Zr, Ti, Al, Y, $TaAl_x$, $WSi_xO_y$, Ce, $TiN_x$, $TaN_x$, $Si_3N_4$, $SiO_xN_y$, $TaO_x$, $SiO_2$, $Al_2O_3$, ZnO, ITO, SDC, SSCO, and YSZ.

Figure 1A:
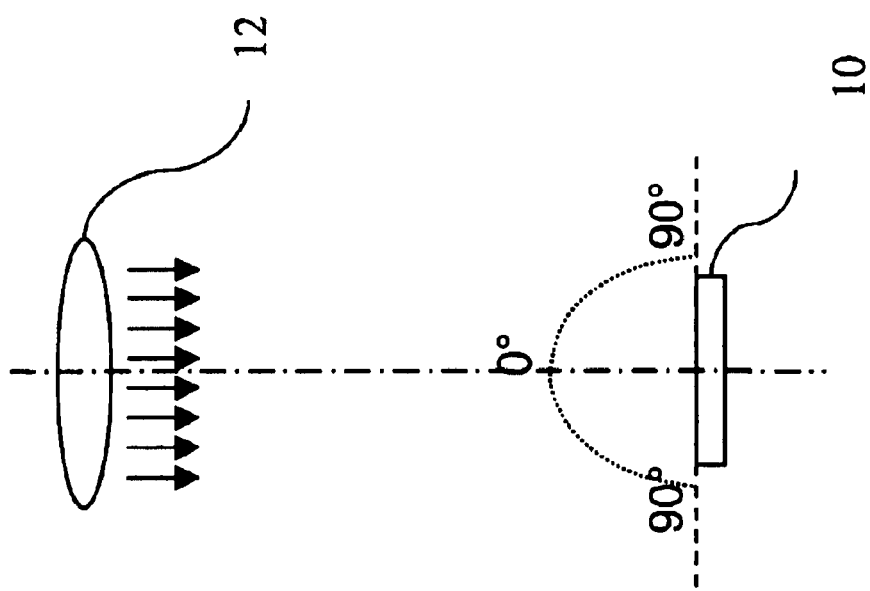

Materials, as used herein, therefore include compounds that can be formed by vapor deposition. $TiN_x$ may be sputtered from a $TiN_x$ target or reactively sputtered from a Ti target in the presence of $N_2$. When sputtering from a $TiN_x$ target, a small amount of $N_2$ is added. The same techniques (substituting a Si target for the Ti target) apply to forming $Si_3N_4$. $Si_xO_yN_z$ may be reactively sputtered from a Si target in the presence of $O_2$ and $N_2$, or it may be sputtered from a $Si_xO_yN_z$ target in the presence of a small amount of $O_2$ and $N_2$. $TaO_x$, $SiO_2$, $Al_2O_3$, ZnO, SDC, SSCO, and YSZ can be reactively sputtered from Ta, Si, Al, Zn, Ce/Sm, Sm/Sr/Co, and Y/Zr targets, respectively, in the presence of $O_2$ or they can be sputtered from oxide targets using a small amount of $O_2$ Referring now to FIGS. 1A–1B, an angle physical vapor deposition (APVD) process utilized by the invention is schematically represented to define the measuring convention for angular measurements between a substrate 10 and a target 12 as used in the present application. Substrate, as used herein, includes any structure suitable for deposition of a film, including multi-layer structures such as an insulator with a conductive layer. The angle α (shown in FIG. 1B) is measured relative to the substrate normal such that FIG. 1A represents α=0. Two targets 12 are shown in FIG. 1B, one having an angle a (measured left of normal) and the other having an angle β (measured right of normal). In some embodiments of the invention, for example, multiple targets may be used for depositing of a material A as a nano-columnar structure, with targets 12 having equal or different (absolute value) angular displacement relative to the substrate normal, and a deposit of a material B from a third source from a different type of target 14. The materials A and B lack miscibility. Angles, rates and substrate temperatures during deposition are controlled to produce different films.

In certain embodiments, the angles and rates of deposition for the A material may be those angles and rates used in conventional GLAD deposition processes. FIG. 2 (Prior art) schematically illustrates a conventional glancing angle deposition (GLAD) process and resultant discontinuous structure. A target 12 deposits material A on a substrate 10 to form nano-columns 16. The flux angle, α, will affect the formation angle θ of the nano-columns 16. Conventional GLAD processes utilize a regime of glancing or highly oblique angle deposition, typically at angles of greater than 75° (90°>α>75°). See, e.g., U.S. Pat. No. 6,206,065, entitled Glancing Angle Deposition of Thin Films to Robbie, et al. Rotation and other movements of the substrate 10 make nano-columns having a more complex shape.

Figures 3A, 3B, 3C:
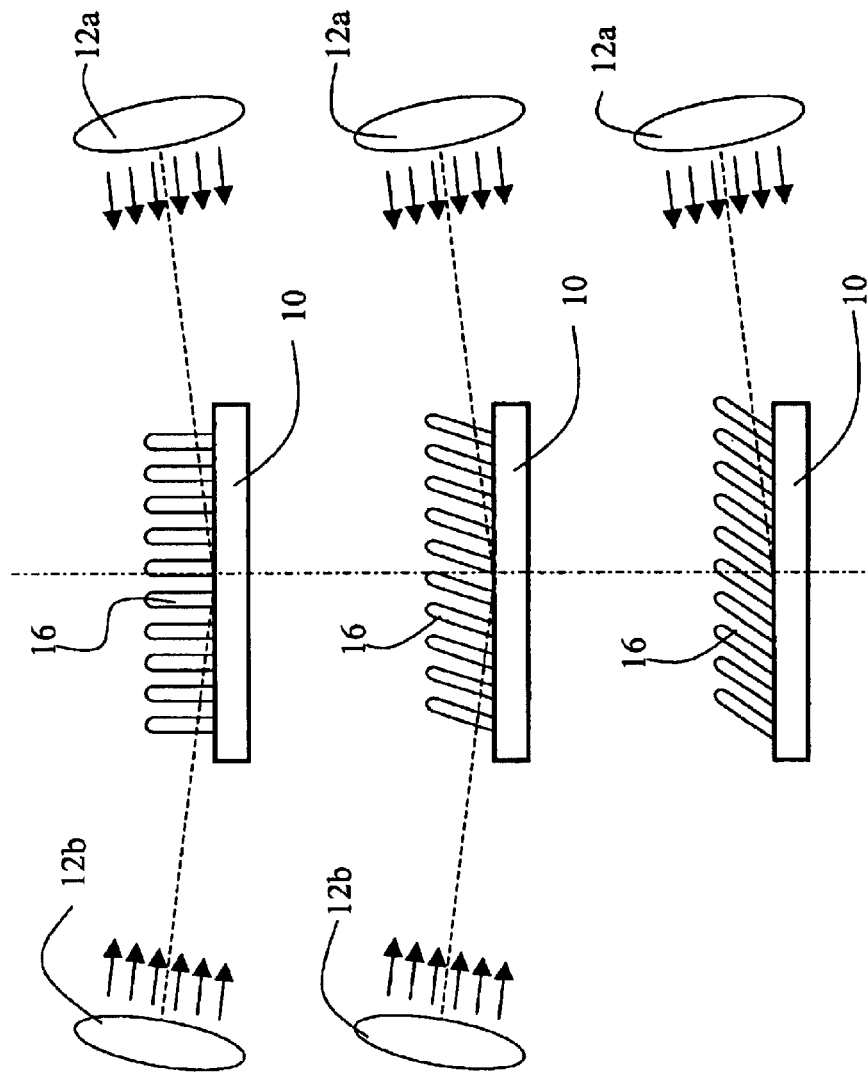
FIGS. 3A–3C (Prior art) illustrate columnar structures formed at different angles from particular discontinuous film deposition conditions.

FIGS. 3A–3C illustrate an alternate technique for changing the angle θ of nano-columns 16. With multiple sputter targets 12a, 12b of the same material A, relative deposition rates will influence the angle θ. In FIG. 3A, the targets 12a and 12b are disposed oppositely at an equal angle α=80° and have equal deposition rates, with 50% of the deposition being attributable to each target 12a and 12b. FIG. 3B alters the deposition rate to favor target 12a, with 70% of the deposition being attributable to target 12a and 30% to target 12b. In FIG. 3C, the deposition is solely attributable to target 12a, i.e., target 12b is off.

Figure 4A:
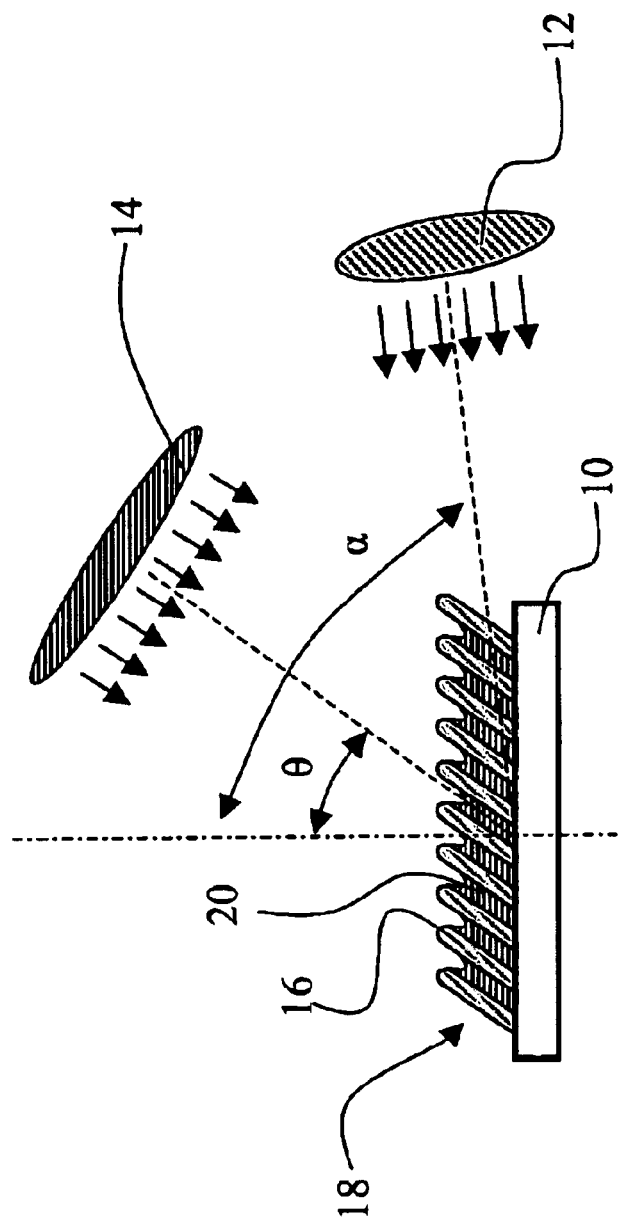
FIG. 4A is a schematic illustration of a preferred embodiment nano-columnar film formation method of the invention and a resultant preferred embodiment film.

FIG. 4A illustrates a preferred method to form a continuous film 18 including nano-columns 16 and filler 20. Deposition conditions, including the angles of deposition of targets 12 (material A) and 14 (material B) and relative rates of deposition are controlled to form the continuous film 18 with nano-columns 16 and filler 20. The substrate 10 is rotated during deposition. The FIG. 4A embodiment uses high deposition angles, >75°, which are the angles used in conventional GLAD deposition. With the invention, co-deposition of material B is conducted at the angle that permits deposition between the nano-columns 16. The ideal angle for such deposition is the angle θ at which the nano-columns 16 form, and co-deposition at the angle θ accordingly forms a preferred embodiment of the invention.

Figure 4B:
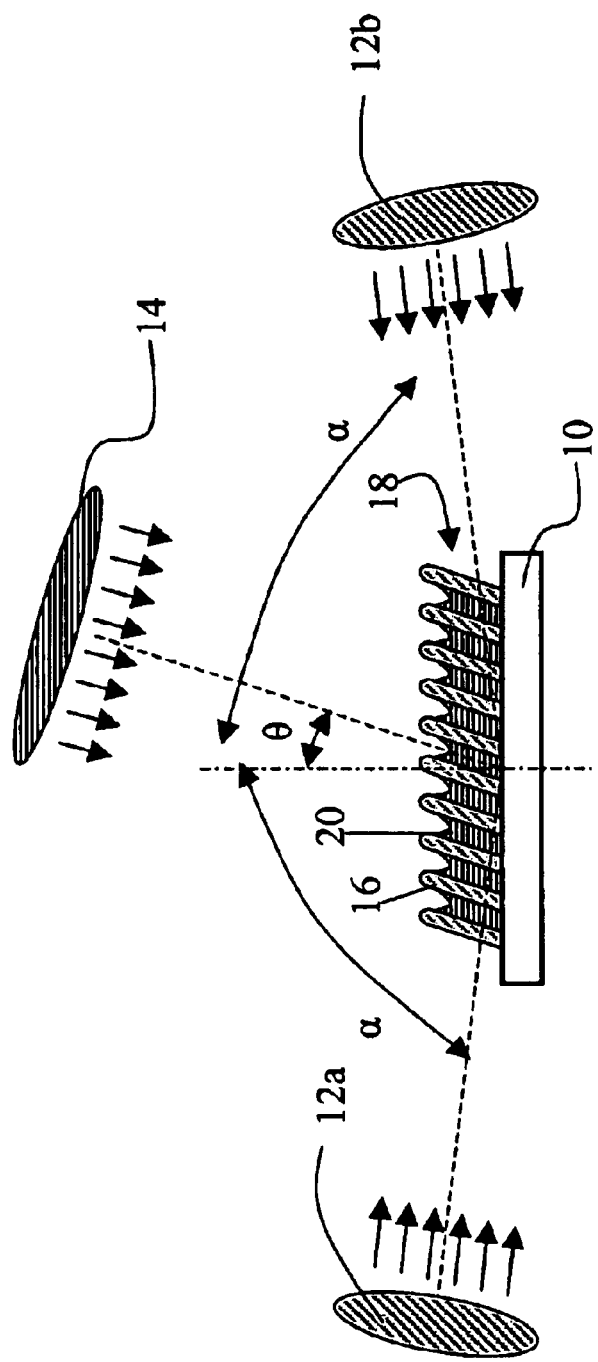
FIG. 4B illustrates an additional preferred embodiment nano-columnar continuous film formation method of the invention and a resultant preferred embodiment continuous film.
Figure 4C:
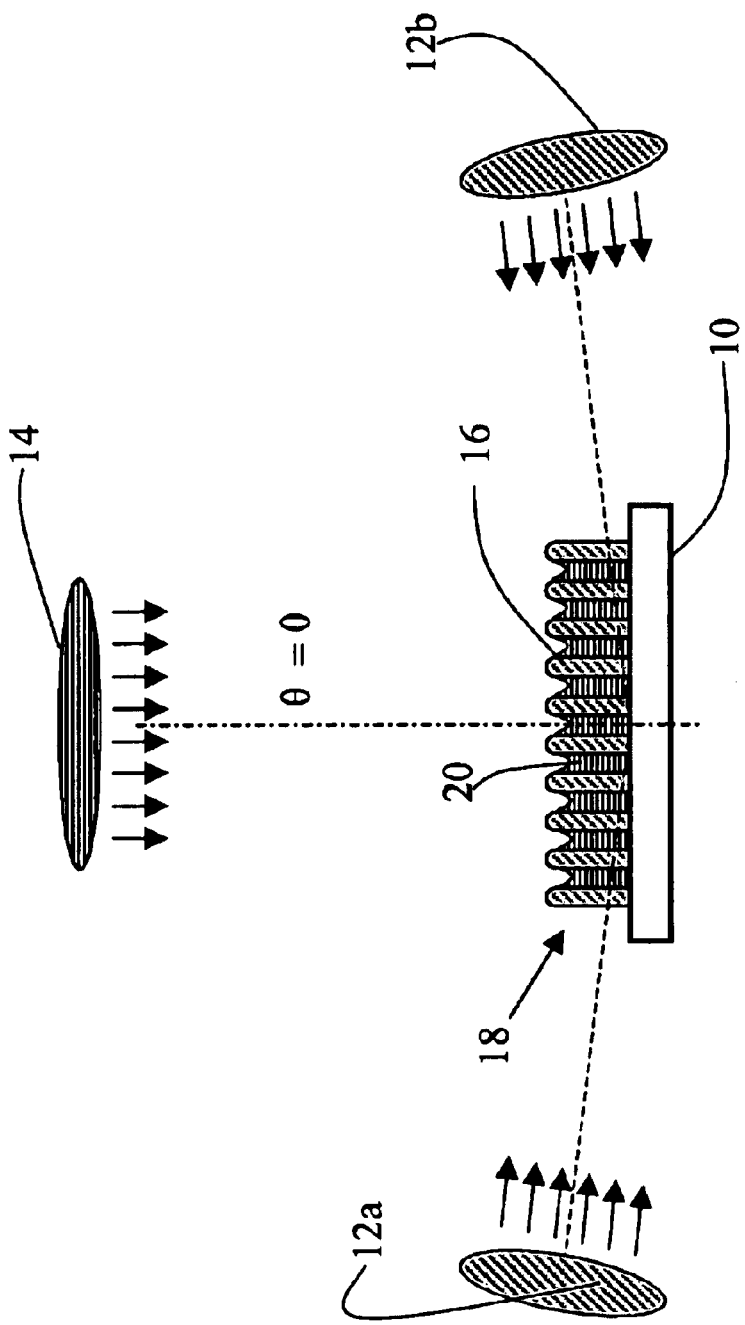
FIG. 4C illustrates an additional preferred embodiment nano-columnar continuous film formation method of the invention and a resultant preferred embodiment continuous film.
Figure 5B:
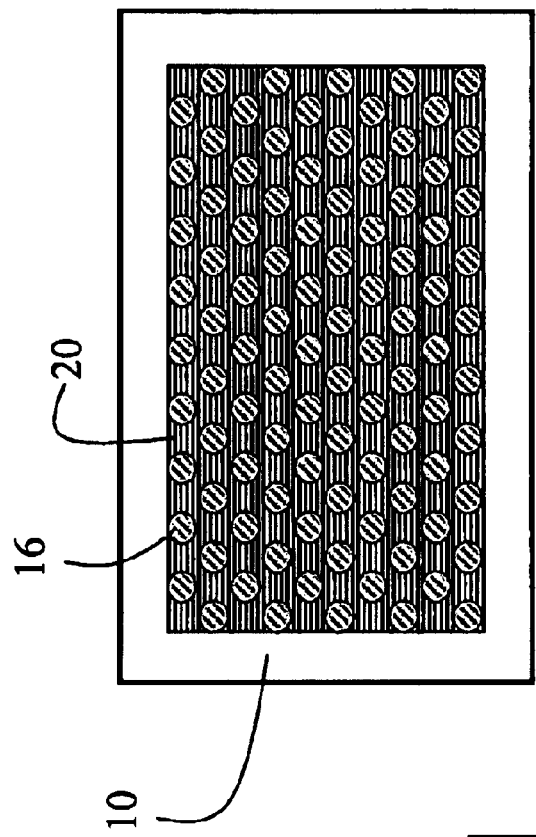
FIGS. 5A and 5B are a schematic cross-section side view and top view of the preferred embodiment film of FIG. 4C.
Figure 5A:
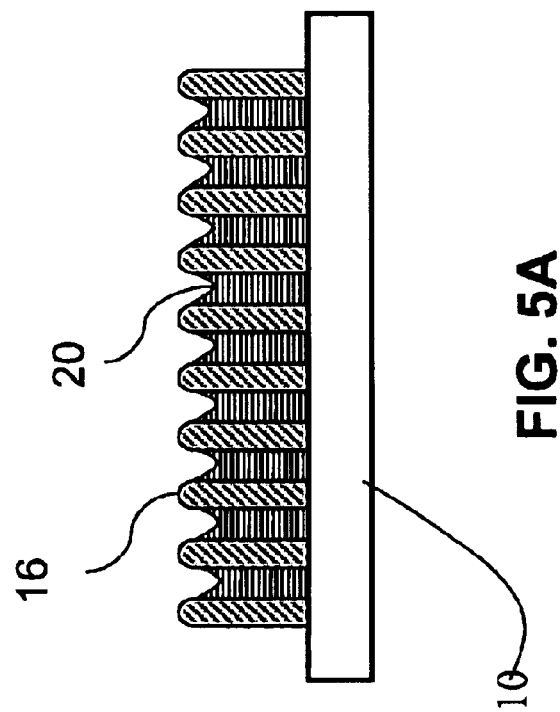

The material B is selected such that it is non-mixable with material A. Another requirement is that the rate of the second (B) material deposition should not exceed the rate of deposition of the first (A) material to avoid the interruption of the nano-columns 16. This condition concerning the relative rates of deposition is measured with respect to the cumulative rates of deposition for each material. Accordingly, when multiple targets 12a, 12b are used to deposit material A for nano-columns, as depicted in FIG. 4B, the rate of deposition of material B must be less than the total rate of deposition from two targets 12a, 12b. FIG. 4B illustrates a case where α=80°, and the rate of 12a is 30% of the total deposition rate of 12a and 12b. FIG. 4C illustrates the case where the deposition rates of 12a and 12b are equal and α=80°. The conditions produce vertical columns with θ=0°, and the target 14 is disposed to deposit material at 0°. The resultant continuous film 18 with material A nano-columns 16 and filler formed of material B is shown in FIGS. 5A and 5B. If the final stage of deposition shuts off the sources 12a and 12b, the film of FIGS. 5A and 5B will form with additional filler 20 encapsulating the columns 16.

Figure 6A:
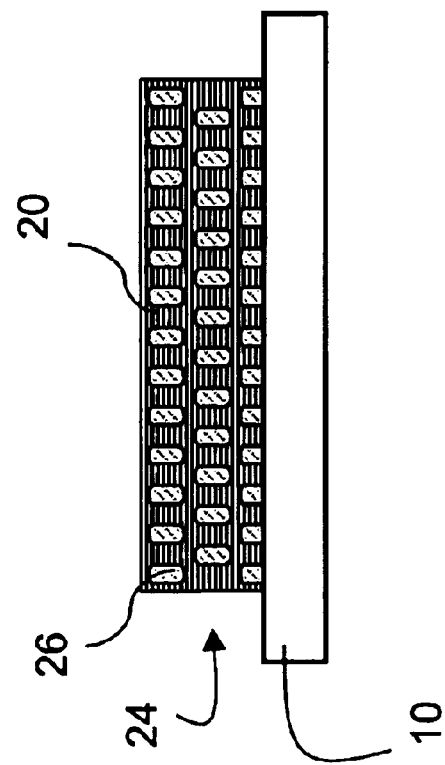
FIGS. 6A and 6B are schematic cross-section side views of a preferred embodiment films.
Figure 6B:
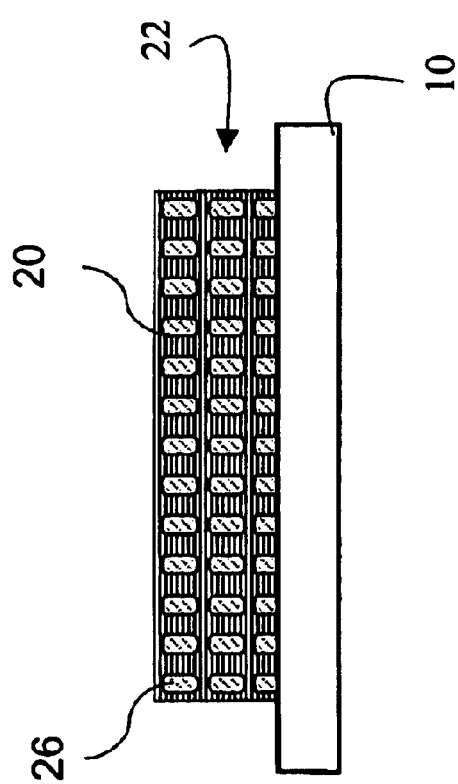

This general principal is exhibited by continuous films 22 and 24 shown in FIGS. 6A and 6B. Fragment nano-columns 26 of material A are embedded in an encapsulation of filler 20 of material B. The formation process for column fragments having θ=0 as in FIGS. 6A and 6B is the formation process shown in FIG. 4C. The fragment columns form when deposition rates of targets 12a and 12b are equal to each other and together exceed the deposition rate of the material B target 14. Interruption of the nano-columns 26 is achieved by interrupting the deposition by targets 12a and 12b to deposit material B. Alternatively, the rates of deposition may be adjusted such that the rate from target B exceeds the cumulative rates from targets 12a and 12b. The length of the column fragments 26 correlates directly with the periods of deposition conditions that result in nano-columnar formations, i.e., deposition of material A exceeding the rate for material B. The angle of columnar formation is affected by the same conditions, target angle and relative rates of multiple targets, as in the embodiments with continuous nano-columns. The relative location of the embedded nano-columnar fragments may be controlled by patterning a seed layer of nucleation sites.

Without use of a patterned seed layer to define nucleation sites, the location of the nano-columnar structures 26 is influenced by whether the initial films do not wet the substrate surface, in which case a self-assembly process defines the locations. Once nano-columnar structures begin to form, the deposition angles define a shadowing region where the low regions behind the structures are not seen by the incoming flux. Also, the diffusion rate of the deposited species is related to the deposition rate of the material. If the diffusion rate is too high, and the deposition rate is too low, then the deposited material atoms have enough time toward diffuse to the substrate and prevent formation of the columnar fragments.

Further films of the invention result from additional growths or post processing of a continuous film of the invention including nano-columns. A preferred embodiment continuous film 28 in FIG. 7A includes a planarized surface 30 with exposed nano-columns 16 and filler 20. The FIG. 7A film 28 may be formed by any technique, e.g., chemical mechanical polishing, suitable to planarize the top of the FIG. 5A film. Subsequent to planarization, addition of a cap layer 32, for example of a third material C, results in the film of FIG. 7B. The cap layer 32 may be deposited on surface 30 of the film 28 of FIG. 7A. The cap layer 32 may be formed by any deposition technique, e.g.: ALD, CVD (CVD, MO CVD, PE CVD, etc.), electrochemical depositions (electrophoretic and/or electrolytic deposition of oxides or polymers, electrodeposition of metal, etc.), PVD, etc.

FIG. 7C illustrates a preferred film 34 including regularly spaced nodules 36 formed when a material layer 38, e.g. a third material C, is added as a cap layer to the film of FIG. 5A. An alternate way to fabricate the film 34 is to form the layer 38 after partial selective etching of the filler 20 from the film 28 in FIG. 7A. A discontinuous film 40 formed of material B is shown in FIG. 7D, and may be realized by selective etching of the nano-columns 16 from film 26 in FIG. 7A. The film 40 may be used as a template to form a film, including a continuous film, or may be utilized as a discontinuous film.

Figure 8:
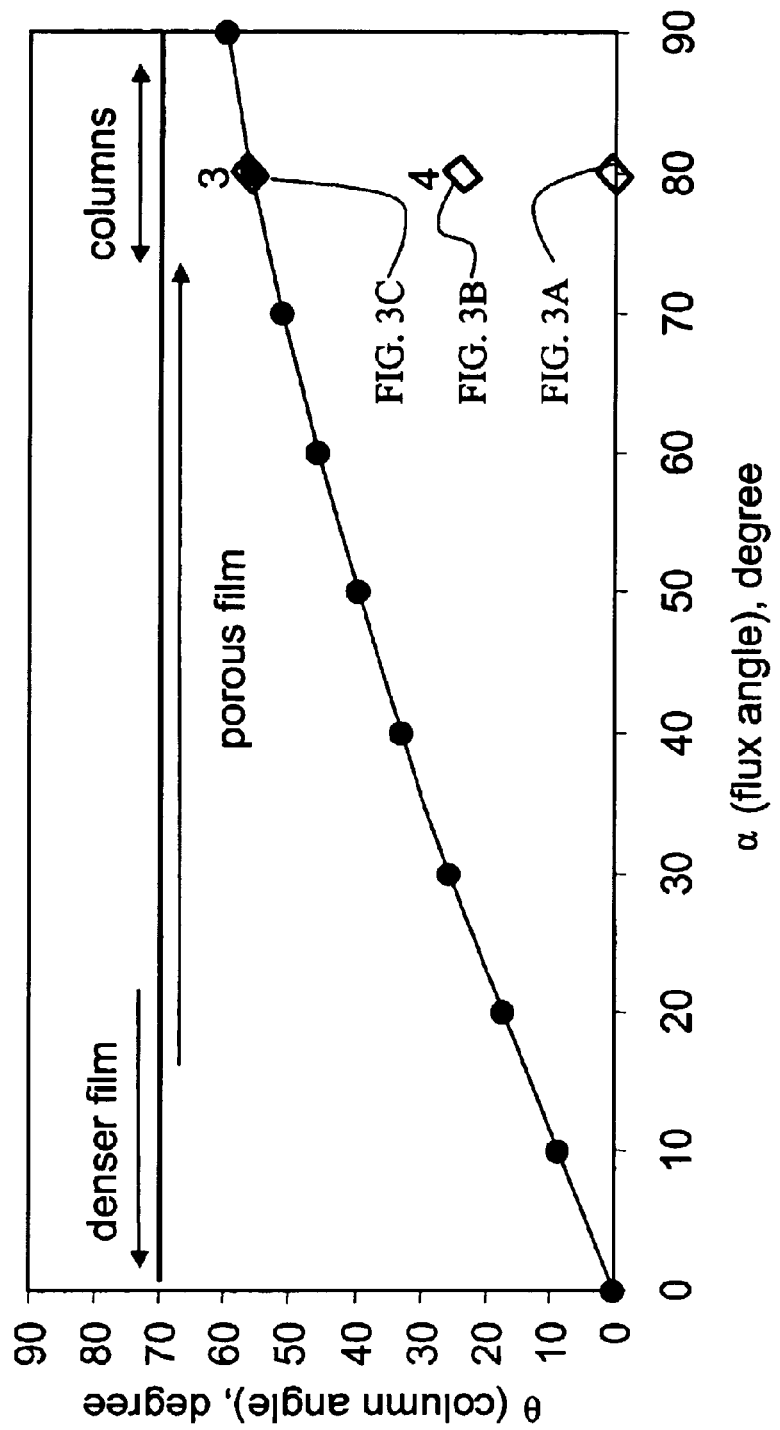
FIG. 8 is a graph illustrating dependence of column angle and film continuity upon flux angle.

FIG. 8 is a graph illustrating dependence of column angle and film continuity upon the flux angle a from a single material A deposit upon a substrate, including the examples of FIGS. 3A–3C. GLAD uses the highly oblique angles when depositing a single material film as the way to deposit discontinuous film, which is when nano-columns form. At smaller angles, approximately smaller than 75°, a continuous film will deposit. Within the range of highly oblique angles that produce a discontinuous film with nano-columns 16 (see FIG. 2) and intervening spaces, the higher angles produce a higher angle θ and more dispersed discontinuous film. A lower angle a produces nano-columns with a lower angle θ and denser film (having fewer/smaller spaces). In the continuous film regime of smaller angles, films with dead-end pores will form with decreasing porosity and dense films form closer to α=0. Within this range where dead-end pores form, it is possible under a limited set of conditions to form a continuous film with throughout porosity. This is a situation when the columns start to touch each other and, as a result, continuous film begins to form. A very narrow angle range will produce films with throughout porosity. The angle range is almost impossible to determine repeatedly, and does not permit control of the level of porosity and pore dimensions. In contrast, certain embodiments of the invention produce continuous films with throughout porosity and a high level of flexibility: pore size and shape as well as the total porosity can be controlled and reproduced. Co-deposition of non-mixable material B with an angular deposition of material A forms columnar structures with filler that will not collapse, thereby preventing the creation of voids. The continuous film may be left with filler B, or may be treated to reduce in volume or remove filler B and create a continuous film with throughout porosity.

Figure 9A:
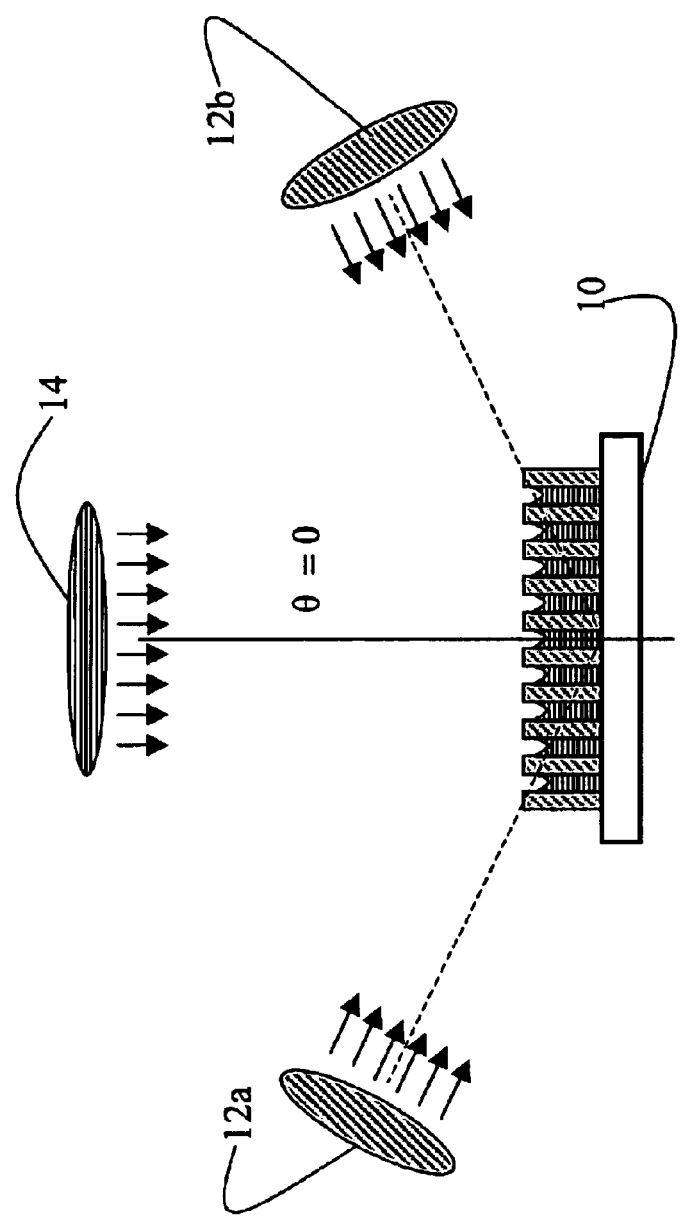
FIG. 9A is a schematic illustration of a preferred embodiment method for formation of porous films.
Figure 9C:
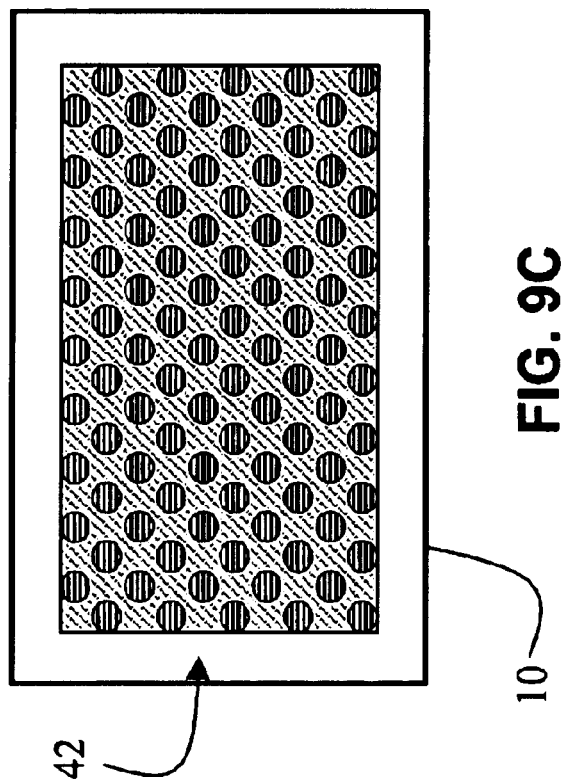
FIGS. 9B and 9C are a schematic side view and schematic top view of a film formed from the FIG. 9A process prior to the creation of pores.
Figure 9B:
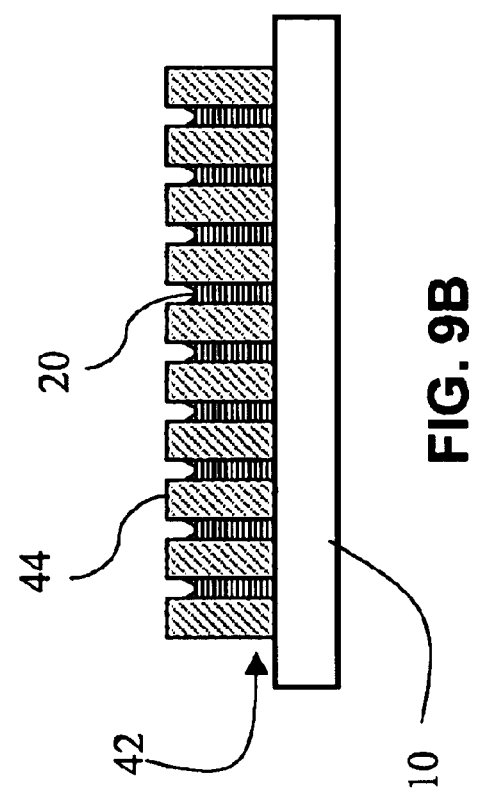

Other embodiment films of the invention therefore include continuous films with throughought porosity. Using the conditions of co-deposition of a non-mixable material and an angular deposition at <~75 degrees, pores can be formed with B material therein. FIG. 9A illustrates a preliminary co-deposition method for formation of porous films. Targets 12a and 12b have an angle of deposition that is preferably between ~30° and ~75°. FIG. 9A illustrates a preferred angle of deposition for each of the targets 12a and 12b of 50°. In the absence of co-deposition, as explained with reference to FIG. 8, deposition of material A at such angles produces continuous films with some porosity. Using co-deposition of non-mixable material B inhibits the collapse of pores that causes the creation of voids. The filler material B supports pores as the film forms. In FIG. 9A, the targets 12a and 12b also have equal deposition rates, and their cumulative rate exceeds the rate of B material deposition from target 14. FIGS. 9B and 9C illustrate the resultant film 42 formed from the FIG. 9A process. There are columns 44 and filler 20. The columns 44 are in the nature of a continuous film with pores filled by filler 20, thereby preventing collapse of the pores. Throughout porosity may be created in the film 42 by treating the film 42 to create pores 46 (see FIG. 10A, FIG. 10B, FIG. 10C).

Densification of the B material to reduce the volume of the B material will create throughout pores, as illustrated in FIG. 10A. The throughout pores 46 form in irregular gaps between the columns 44 and filler 20 to create film 47. Columns 44 in the FIG. 10 embodiment are a continuous film with pores 46 supported by the filler 20. They are not discontinuous columnar structures like the columns 16 in the FIGS. 5A and 5B embodiment. In this application, however, the supported porous film 44 with throughout pores 46 supported by filler 20 (that may subsequently be reduced in volume or removed) is considered to be a form of nano-columnar structure. Annealing is an exemplary process that can be used for densification. Throughout pores can also be achieved if material A can be densified. Another way to create the film of FIG. 10A is to decrease the volume of B component by reduction. An example throughout porosity deposition film was created by an angular co-deposition of SDC (RF sputtering) and NiO (reactive deposition of NiO from Ni in the presence of oxygen) to produce a NiO/SDC film. After annealing the film and reduction of NiO to Ni, a structure similar to 10A was obtained. This is a preferred structure for a fuel cell anode.

With different materials for A or B, the FIG. 10B structure film 48 is produced where pores 46 are created by altering the filler material 20. In this embodiment, the material B, after densification, has an adhesion to the material A of the columns 44.

A selective etching of material B from either of the FIGS. 10A and 10B films gives a throughout porosity continuous film 50, seen in FIG. 10C. A modified film 52, shown in FIG. 10D is produced by treating surfaces of film of FIG. 10C with the deposition of another material layer 54, such as a third material C. As mentioned above, any technique can be used for deposition of another material: ALD, CVD (CVD, MO CVD, PE CVD, etc.), electrochemical depositions (electrophoretic and/or electrolytic deposition of oxides or polymers, electrodeposition of metal, etc.), PVD, etc. Throughout porosity is significant for a wide range of applications that benefit from the increased surface area offered by throughout pores and the potential for flow through from one side of a film to another. Important examples of applications that would benefit from continuous thin films with throughout porosity include fuel cells, separation and catalytic membranes, and sensors.

Figure 11:
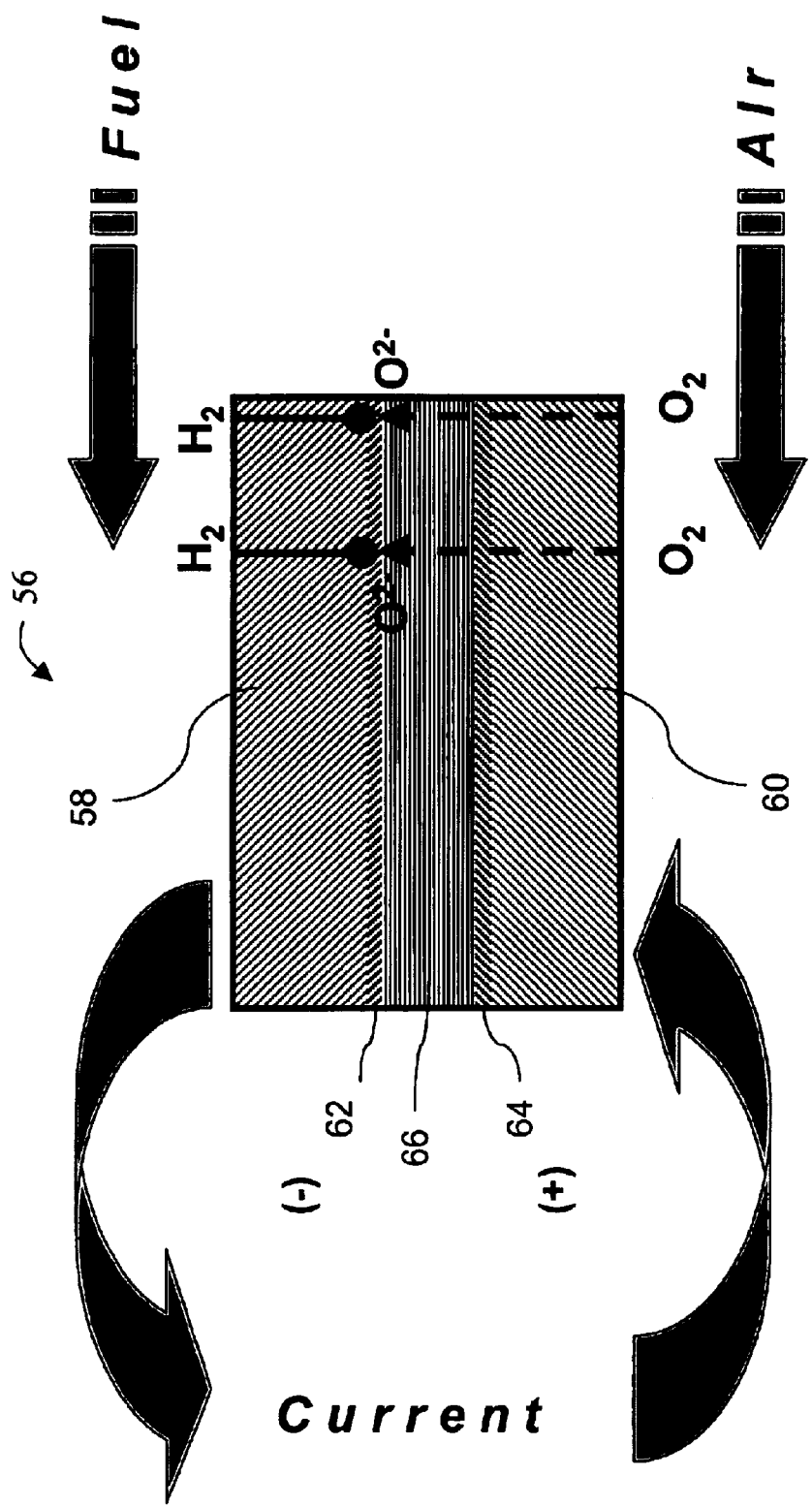
FIG. 11 schematically illustrates a preferred embodiment fuel cell of the invention.

FIG. 11 shows a thin-film solid oxide fuel cell 56 including an anode 58 and cathode 60 films of the invention with throughout porosity. The anode 58 and cathode 60 form an anode interface 62 and cathode interface 64 at an electrolyte 66, for example yttria-stabilized zirconia. Oxidation to produce current occurs in the presence of fuel and air. The throughout porosity of can significantly increase the performance of the anode 58 and the cathode 60. A higher surface area ratio increases the number of catalytic active sites per mass, volume, and/or thickness of the material. The availability of catalytic active sites to fuel and/or air is increased compared to thin films lacking the throughout porosity and accordingly providing a smaller surface area within its pores. In addition, throughout porosity increases the three-phase boundary area between the anode/cathode and the electrolyte of the fuel cell. In particularly preferred embodiments, the thin film used to form the anode and cathode is a composite film including an electron and ion conductive material and an electrocatalyst.

A preferred specific embodiment of the invention based upon, for example, the FIG. 7A structure, is an ordered templated array of nanowires. With reference to FIG. 7A, the nano-columns 16 form a nonlinear resistive array, the B material layer 20 is a less conductive layer or dielectric, and the substrate is conductive or includes a thin conductive layer at the interface with the nano-columns 16. The electrical field generates emission from top ends of the nano-columns 16. Emission centers may be constructed based upon this embodiment having high density, i.e., $10^5$–$10^{10}$ per cm. Modifications of this specific embodiment include any variation of the nano-column shape.

Another preferred specific embodiment of the invention based upon, for example, the FIG. 7B structure that includes an additional layer 32 formed as a tunneling dielectric material. The tunneling dielectric layer will serve as a protection for the emitter surface. The additional layer 32 can also be deposited without prior planarization of the nano-columns 16, e.g., as in the FIG. 7C embodiment.

A preferred tunnel emitter device shown in FIG. 12 may be formed based upon the FIG. 7B film 28. The substrate 10 in this embodiment can be a semiconductor material as well. A tunnel emitter is fabricated by adding a conductive layer 68.

In another example, the use of an additional layers 32 and 68, without prior planarization, like that shown in FIG. 7C structure (38 consist of 32 and 68), produces a preferred nodular silicon emitter device. In this exemplary embodiment, the nano-columns 16 comprise silicon, the substrate 10 comprises silicon, the filler 20 comprises silicon dioxide, and the thin additional layer 38 comprises a tunneling dielectric and good tunneling conductive layers. An exemplary dielectric layer comprises silicon dioxide and an exemplary conductive layer comprises platinum or gold. Because the nano-columns 16 provide a highly organized structure, nodules 36 are regularly spaced, FIG. 7C. This uniformity of spacing in nodular silicon provides distinct advantages over the random and disorganized nature of conventional nodular silicon. In the organized structure of the invention, for example, there will be high uniformity of emission across the surface of the nodular silicon.

Suitable tunneling dielectrics, 10–500 Å, are those with high electrical strength ~>10 MV/cm, e.g. $SiO_2$, $Al_2O_3$, $TiO_x$, $SiO_xN_y$, $SiN_x$, $TaO_x$, $WSi_xO_y$, $HfO_x$, or BN, etc. Suitable conductive layers, 10–100 Å, are those which are semitransparent for electrons, including thin layers of metal and conductive or semi conductive compounds or/and alloys.

Another preferred example film is an encapsulated phase change media (where, e.g., $In_xSe_y$, $InSe_xTe_y$, GaSe, $GaSe_xTe_y$, Se, and similar materials form the columns 16 and a suitable insulation, such as $SiO_2$, $Al_2O_3$, $SiO_xN_y$, etc., is the filler), either with or without an additional material layer as a cap layer. Phase change media, for example, may be based upon the FIG. 6A, 6B, 7A, 7B or 7C embodiments.

An encapsulated cylindrical magnetic domain dia- or paramagnetic template for magnetic storage devices including giant magnetic resonance devices may be formed based upon the FIG. 6A, 6B, 7A, or 7C embodiments using magnetic materials (e.g., Cr, Fe, Co, Ni, and some of their oxides, e.g., NiCo, NiFe alloys, and similar materials), templated in a para- or diamagnetic matrix (e.g., Pd, $TiN_x$, $Al_2O_3$, and similar materials).

Sub-micro capillary and sub-micro channel plates that are ordered templated structures having high aspect ratio, e.g. 1:20–1:100, cylindrical holes may be formed based upon the FIG. 7D embodiment using materials with secondary emission properties and electrical conductivity high enough to dissipate surface charge, induced by electron avalanche in channels, and not too high to get channels electrically shorted. Suitable materials include $SiO_2$, $PbO_x$, $TiO_x$, $Mg_xBe_yO$, $Be_xAl_yO$, $Cu_xBeO$, $Cu_xAl_yO$, and any complex oxide combination including but not limited MgO, $Al_2O_3$, BeO, $Cu_xO$, $Ni_xO$, $TiO_x$, $ZnO_x$, $SnO_2$ $TaO_x$, ITO, $PbO_x$, and others transitions' metal oxides, nano-crystalline composite materials, for example Si·$SiO_2$, WSiOx etc. At a certain voltage bias, single electron emission events will be amplified through an electron avalanche inside the hollow channels.

Getter (used to maintain vacuum in a sealed package) may be formed from the FIGS. 1A, 10B, 10C and 10C structures due to well-developed surface areas. Film 50 in FIG. 10C can be the getter if columns 44 are deposited from the proper material. Getter may also be a separate material layer, such as the additional layer 54. Suitable getter materials preferably include Ti, Zr, Al, V, Ta, Fe, Ni, and their alloys. Etching of filler 20 increases surface area and, as a result, an efficiency of getter.

While a specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A continuous thin film comprising:
   nano-columnar structures of a first material formed on a substrate with a second non-mixable material co-deposited with said nano-columnar structures as a filler between and around said nano-coumnar structures.

2. The continuous thin film of claim 1, wherein said filler of said second non-mixable material encapsulates said nano-columnar structures.

3. The continuous thin film of claim 2, wherein said nano-columnar structures comprise fragmented nano-coumnar structures.

4. The continuous thin film of claim 1, further comprising a planarized surface.

5. The continuous thin film of claim 4, wherein said planarized surface exposes at least some of said nano-columnar structures and at least part of said filler.

6. The continuous thin film of claim 4, further comprising a material layer deposited upon said planarized surface.

7. The continuous thin film of claim 1, further comprising a material layer deposited upon said nano-columnar structures.

8. A nodular silicon emitter device formed of a continuous thin film of claim 7, having emission sites defined by the nano-columnar structures and wherein said material layer deposited upon said nano-columnar structures comprises a thin conductive layer.

9. The device of claim 8, wherein said nano-columnar structures comprise silicon, said substrate comprises silicon, said filler comprises silicon dioxide and said thin conductive layer comprises one of a metal, alloy or semiconductor.

10. The device of claim 8, wherein said nano-columnar structures form regularly spaced and uniform nodules under said thin conductive layer.

11. The continuous thin film of claim 1, wherein said nano-columnar structures are disposed at an angle of $\theta=0°$ with respect to a normal of said substrate.

12. An encapsulated phase change media formed of the continuous film of claim 1, wherein a phase change material comprises the first material.

13. The phase change media of claim 12, wherein said first material is selected from the group consisting of $In_xSe_y$, $InSe_xTe_y$, GaSe, $GaSe_xTe_y$, and Se.

14. The phase change media of claim 12, further comprising a planarized surface and a material layer deposited upon said planarized surface.

15. A magnetic material formed of the continuous film of claim 1, wherein said nano-columnar structures comprise a magnetic material and said filler comprises a para- or diamagnetic matrix.

16. A sub-micro capillary plate formed of the continuous film of claim 1 and processed to remove said nano-columnar structures, wherein said filler comprises conductive material having secondary emission properties and gaps left by said nano-columnar structures comprise cylindrical holes.

17. The continuous film of claim 1, wherein said nano-columnar structures themselves form a porous continuous film and said filler fills pores of said porous thin film.

18. The continuous film of claim 1, wherein:
   said first material is selected from the group consisting of Au, Sm, Co, Zr, Ti, Al, Y, $TaAl_x$, Ce, $TiN_x$, $TaN_x$, $Si_3N_4$, $SiO_xN_y$, $TaO_x$, $SiO_2$, $Al_2O_3$, ZnO, SDC, SSCO, and YSZ; and
   said second material is different from said first material, able to be co-deposited with the first material and selected from the group consisting of Au, Sm, Co, Zr, Ti, Al, Y, $TaAl_x$, Ce, $TiN_x$, $TaN_x$, $Si_3N_4$, $Si_xO_yN_z$, $TaO_x$, $SiO_2$, $Al_2O_3$, ZnO, SDC, SSCO, and YSZ.

19. A continuous thin film, comprising:
   a material layer deposited as a thin film upon a substrate, said material layer comprising nano-columns of a first material surrounded by filler of a second non-mixable material; and
   pores supported by said second material and extending completely through said material layer.

20. The continuous thin film of claim 19, wherein said second material is reduced in volume from its initial deposition state.

21. The continuous thin film of claim 20, further comprising a third material deposited upon said material layer.

22. The continuous film of claim 20, wherein said second material forms getter.

23. The continuous thin film of claim 21, wherein:
   said first material is selected from the group consisting of Au, Sm, Co, Zr, Ti, Al, Y, $TaAl_x$, Ce, $TiN_x$, $TaN_x$, $Si_3N_4$, $SiO_xN_y$, $TaO_x$, $SiO_2$, $Al_2O_3$, ZnO, SDC, SSCO, and YSZ; and
   said second material is different from said first material, able to be co-deposited with the first material and selected from the group consisting of Au, Sm, Co, Zr, Ti, Al, Y, $TaAl_x$, Ce, $TiN_x$, $TaN_x$, $Si_3N_4$, $SiO_xN_y$, $TaO_x$, $SiO_2$, $Al_2O_3$, ZnO, SDC, SSCO, and YSZ.

24. A thin film fuel cell, having an anode and cathode both formed of the continuous thin film of claim 19.

* * * * *

UNITED STATES PATENT AND TRADEMARK OFFICE
CERTIFICATE OF CORRECTION

PATENT NO.    : 6,770,353 B1
DATED         : August 3, 2003
INVENTOR(S)   : Mardilovich et al.

It is certified that error appears in the above-identified patent and that said Letters Patent is hereby corrected as shown below:

Column 2,
Line 42, delete "(1-x)" and insert therefor -- $_{(1-x)}$ --
Line 46, after first occurrence of "B" insert a dash Column 3,
Line 3, delete "cell s" and insert therefor -- cells --
Line 63, delete "a" and insert therefor -- $\alpha$ --

Column 4,
Line 38, "FIG. 4A" should not begin a new paragraph

Column 5,
Line 64, after "angle" delete "a" and insert therefor -- $\alpha$ --

Column 7,
Line 36, after "porosity" delete "of"

Column 8,
Lines 23 and 26, delete "500 Å" and insert therefor -- 500Å --
Line 63, delete "1A" and insert therefor -- 10A --

Signed and Sealed this

Tenth Day of May, 2005

JON W. DUDAS
*Director of the United States Patent and Trademark Office*